No. 764,826. PATENTED JULY 12, 1904.
C. B. SCHOENMEHL.
GALVANIC BATTERY.
APPLICATION FILED NOV. 2, 1900.
NO MODEL.
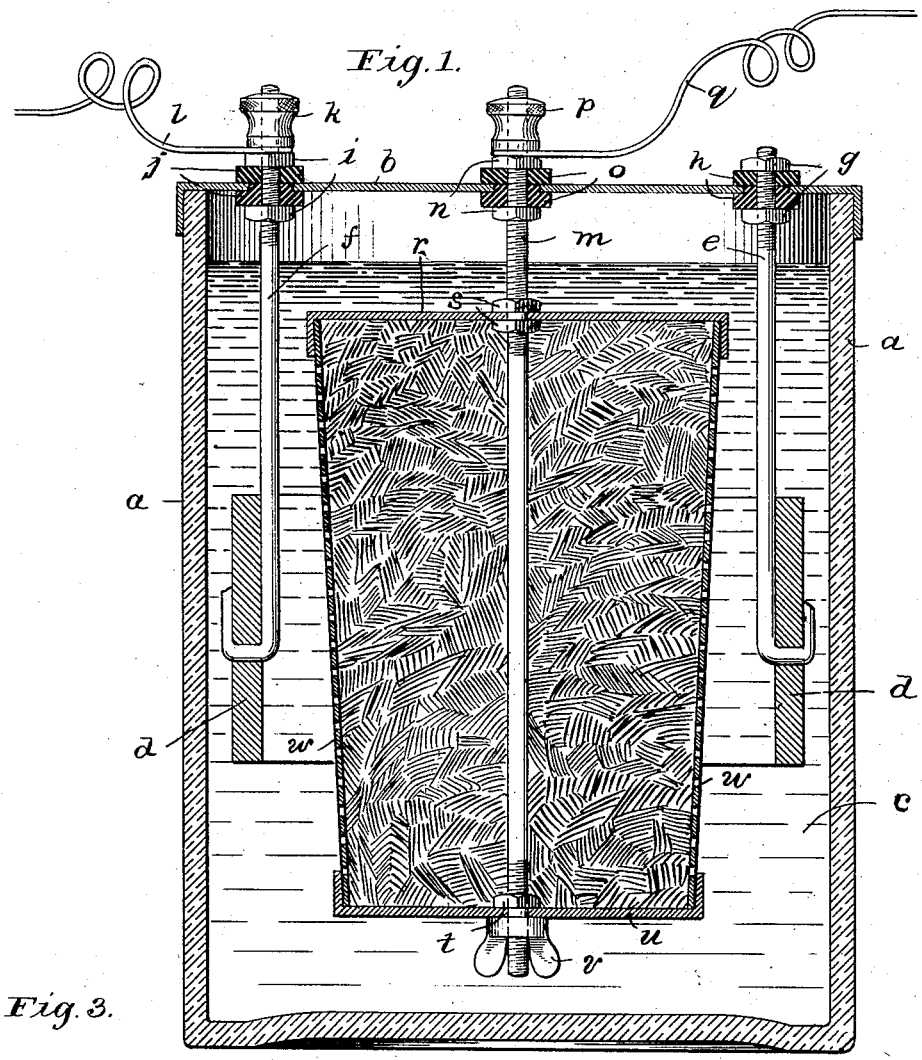
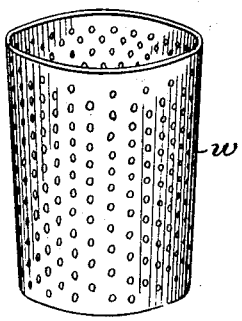
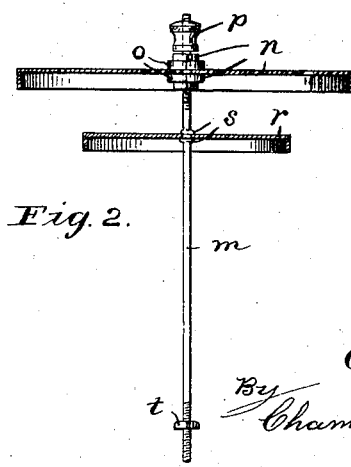
Witnesses
R. H. Newman
W. V. Devitt
Inventor
CHARLES B. SCHOENMEHL
By Chamberlain & Newman
Attorneys No. 764,826. Patented July 12, 1904.

UNITED STATES PATENT OFFICE.

CHARLES B. SCHOENMEHL, OF WATERBURY, CONNECTICUT, ASSIGNOR TO THE WATERBURY BATTERY COMPANY, OF WATERBURY, CONNECTICUT, A JOINT STOCK COMPANY.

GALVANIC BATTERY.

SPECIFICATION forming part of Letters Patent No. 764,826, dated July 12, 1904.

Application filed November 2, 1900. Serial No. 35,234. (No model.)

*To all whom it may concern:*

Be it known that I, CHARLES B. SCHOENMEHL, a citizen of the United States, and a resident of Waterbury, in the county of New Haven and State of Connecticut, have invented certain new and useful Improvements in Galvanic Batteries, of which the following is a specification.

My invention relates to improvements in galvanic batteries of the open-circuit type, such as are used for railroad signal-work and numerous other places and wherein zinc constitutes the positive and oxid-of-copper scale the negative element, both of which are used in connection with a suitable caustic or other solution. When batteries of this class become exhausted, considerable trouble and unnecessary loss of time is necessary to recharge the same, and this is especially true of the various types employing a so-called "basket" to retain the copper oxid. The negative element, as previously implied, comprises oxid-of-copper scale placed in a suitable basket or other receptacle. This scale when consumed has to be removed from the receptacle and a fresh charge inserted. The scale when consumed becomes more or less solidified and adheres greatly to the receptacle, with the result that it is difficult and almost impossible in some instances to properly remove it and is frequently necessary to gouge it out with a chisel or other instrument.

It is therefore the object of my invention to produce a battery element of the above class whose ingredients will be thoroughly and uniformly consumed, can be conveniently and readily recharged, which shall be of the simplest possible type to produce the result desired, being cheap in construction, simple of operation, easily manipulated, and otherwise generally desirable to the trade.

With the above objects in view my invention resides and consists in the novel and simple construction of a battery and combination of parts shown in the accompanying sheet of drawings, forming a part of this specification, upon which similar characters of reference denote like or corresponding parts throughout the several figures, and of which—

Figure 1 shows a central vertical cross-section throughout a complete battery embodying my improvement. Fig. 2 is a diminutive detail view of a central rod for supporting the negative element, together with the covers for the jar and negative element fixed thereto. Fig. 3 is a detail perspective view of a conical-shape cylindrical tube which is attached to the lower cover shown in Fig. 2 and which when assembled forms a basket to receive the oxid of copper and constitutes the negative element of the battery. Fig. 4 is a detail perspective view of the bottom of the basket shown in Figs. 1 and 3.

Referring in detail to the characters of reference marked upon the drawings, $a$ represents the usual form of jar to contain the battery elements, and $b$ the cover, which is indicated as formed of sheet metal. Within the receptacle is a suitable caustic or other solution $c$, into which the positive and negative elements of the battery are submerged.

The positive or zinc element of the battery $d$ is preferably of a cylindrical form and supported from the cover by means of vertically-disposed rods $e$ and $f$. The rod $e$ in practice is preferably of iron and secured in place by means of nuts $g$ and insulated from the cover by means of rubber washers $h$. The rod $f$ is designed to also serve as a conducting medium and is consequently formed of brass. Its attachment to the cover is similar to that of the iron rod, being provided with clamping-nuts $i$ and insulating-washers $j$. A binding-screw $k$ is applied to the threaded extremity of the rod and is designed for attaching field-wire $l$ in the usual manner.

The negative element of my battery comprises the essential features and consists, first, in a centrally conducting and supporting rod $m$, which is attached to the cover in any suitable way—as, for instance, by means of clamping-nuts $n$ and insulating-washers $o$, together with a binding-screw $p$ for attaching the field-wire $q$. To this rod I permanently attach the cover $r$ of the basket containing the negative element $x$. This cover may be secured by means of jam-nut $s$, as shown in Fig. 1, or the stock of the rod may be set up on either side of said cover to hold it in place, as shown in Fig. 2. The former construction (shown in Fig. 1) will permit of a vertical adjustment of the cover, if necessary, when first assembling, while the latter will be fixed once for all. To the lower end of the rod $m$ I also attach a suitable nut $t$, which serves to receive the bottom $u$ of the basket, said bottom being held firmly in place by means of a thumb-nut $v$, as clearly appears in Fig. 1. The body of the basket $w$ is perforated, as shown in the drawings, and is of a conical shape, being larger at the top than the bottom. This body is held between the two end caps $r$ and $u$, the flanges of which overlap the edge of the body in a manner to prevent any lateral displacement.

The purpose of the conical shape of the basket is twofold—first, to produce a basket which is larger at the top than the bottom, thus providing an element having a larger quantity of oxid of copper at the upper end, where the solution is the strongest, and giving a more uniform and complete consumption and coloring of the same; second, the conical-shaped basket insures a free and easy discharge of the consumed ingredient when the batteries become exhausted, it being simply necessary to withdraw the rod from the basket and give said basket a few taps at the enlarged end, whereupon the entire mass will drop out in a lump, after which it may be reoxidized. In some instances I may elect to simplify and cheapen this element by omitting the use of the cover P and the parts intermediate thereof and the top cover $b$, thus placing the basket jam up against the said top cover $b$.

The manipulation of the basket for recharging is as follows: The operator simply lifts the cover from the jar, together with the attached parts, including both elements of the battery, after which the thumb-nut $v$ is run off from the end of the rod $n$. The cover $u$ and the nut $t$ are next removed with the body of the basket, which, together with its residue, is slipped off from the rod, given a few taps, causing said residue to become freed and drop out. The basket may then be placed back against the top cover $r$ and the new charge of copper poured in, whereupon the lid $u$ and the thumb-nut $v$ would all be firmly replaced, as before. This construction permits of a quicker manipulation in recharging than any battery which I know of and is, as before stated, obviously desirable to the trade.

Having thus described my invention, what I claim, and desire to secure by Letters Patent, is—

1. In a battery, the combination with the other parts, of a basket circular in cross-section for holding a depolarizer having exterior perforated tapering side walls producing a conical-like receptacle larger at its top end than the other and a removable cover for one of said ends.

2. In a battery, the combination with the other parts, of a removable perforated depolarizer-basket circular in cross-section with tapering side walls and being broader through one end than the other, a removable cap or caps for one or both of said ends, and a zinc encircling said basket.

3. In a battery, the combination with the other parts, of a receptacle for holding a depolarizer, supported from the cover or bridge of the battery-cell and provided with a perforated wall inclined at an angle other than a right angle to a vertical line passing through the receptacle, a rod, covers inclosing the basket and means for detachably securing the covers to the rod.

4. In a battery, the combination with the other parts, of a receptacle for holding a depolarizer having its side walls perforated and set at an angle other than a right angle to a vertical line passing through said receptacle, a central rod and a removable cap for the receptacle, and means for detachably securing said cap to the rod and receptacle.

5. In a battery, the combination with the other parts, of a conical depolarizer-basket having exterior perforated tapering side walls, producing a receptacle larger through one end than the other, oxid-of-copper scale in said basket and a zinc encircling said basket.

6. In a galvanic battery of the class described, a negative element comprising a central rod having a cover attached thereto, a conical receptacle detachably connected to said cover, a lid to inclose the smaller end of the receptacle, and detachable nuts fixed to the lower end of the rod to permit of the removal of the lid and the withdrawal of the body, oxid-of-copper scale and a zinc inclosing the basket.

7. In a battery of the class descibed, a negative element comprising a conical-shaped basket adapted to receive oxid-of-copper scale, separate ends inclosing said basket, a central rod passing through said basket, detachable nuts for clamping said ends to the rod and conical basket and means for supporting said element on the cover of a jar.

8. In a battery of the class described, the combination of a jar containing a suitable conducting solution and a positive element, of a negative element located therein and comprising a perforated basket having diverging side walls, a central binding-rod, removable ends therefor and nuts for clamping said ends to the body of the basket.

9. In a battery of the class described, the combination with a jar containing a suitable conducting solution and a positive element, of a negative element comprising a suspending and conducting rod, of a cover adjustably secured thereto, a perforated body beneath said cover having diverging side walls of a larger diameter at the top than the bottom, a removable cover inclosing the lower end of said body and detachable nuts for removing said lower cover irrespective of the upper one, substantially as shown and described.

10. In a battery, the combination with the other parts, of a receptacle for holding a depolarizer, supported above the bottom of the battery-cell and provided with a perforated wall inclined at an angle other than a right angle to a vertical line passing through the receptacle, all substantially as set forth.

Signed at Bridgeport, in the county of Fairfield and State of Connecticut, this 30th day of October, A. D. 1900.

CHARLES B. SCHOENMEHL.

Witnesses:
C. M. NEWMAN,
ANNA WANAMAKER.